C. R. WEST.
AIR PUMP ATTACHMENT FOR AUTOMOBILES.
APPLICATION FILED JUNE 6, 1917.
1,282,506.
Patented Oct. 22, 1918.
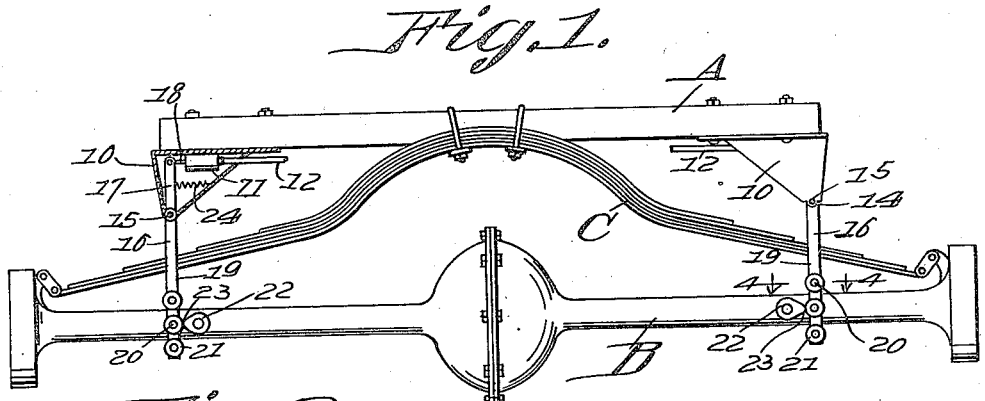
Fig. 1.
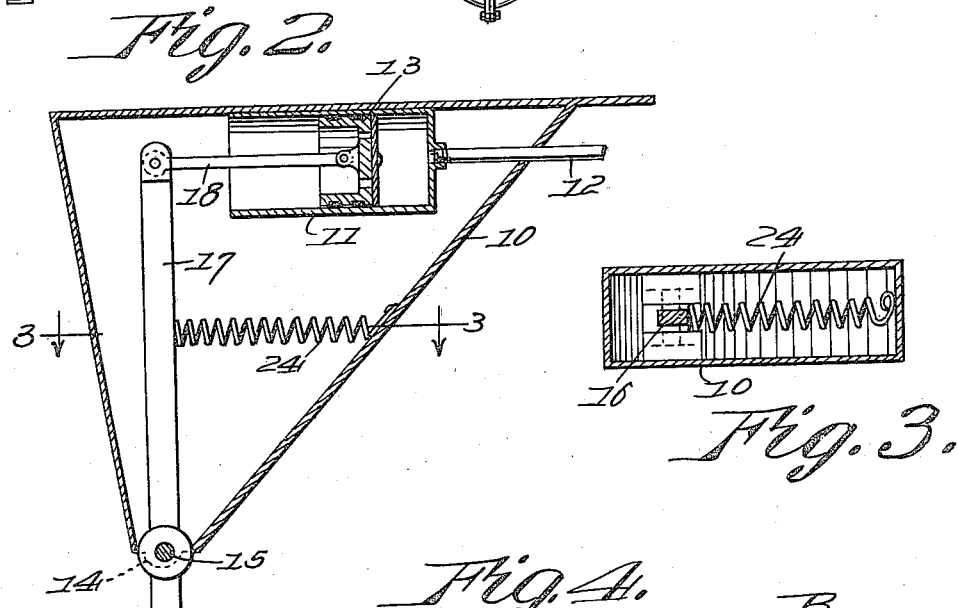
Fig. 2.
Fig. 3.
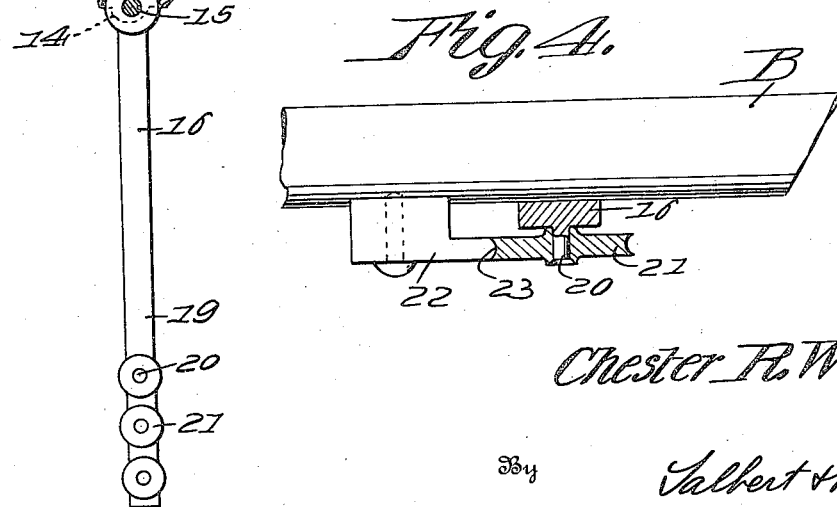
Fig. 4.
Inventor
Chester R. West,
By
Talbert & Parker
Attorneys

UNITED STATES PATENT OFFICE.

CHESTER R. WEST, OF MADISON, GEORGIA, ASSIGNOR OF ONE-HALF TO Q. L. WILLIFORD, OF MADISON, GEORGIA.

AIR-PUMP ATTACHMENT FOR AUTOMOBILES.

1,282,506.

Specification of Letters Patent.  Patented Oct. 22, 1918.

Application filed June 6, 1917. Serial No. 173,122.

*To all whom it may concern:*

Be it known that I, CHESTER RANKIN WEST, a citizen of the United States, residing at Madison, in the county of Morgan and State of Georgia, have invented certain useful Improvements in Air-Pump Attachments for Automobiles, of which the following is a specification, reference being had therein to the accompanying drawing.

The invention relates to a pump structure, and more particularly to the class of automatically operated air pump attachments for automobiles.

The primary object of the invention is the provision of a pump attachment of this character wherein the rocking movement or the up and down vibrations imparted to the body of an automobile incident to its travel will effect the automatic operation of said pump attachment for the supplying of air to a storage tank for the subsequent use of the air in filling tires, actuating a starter or for any other purpose desired.

Another object of the invention is the provision of a pump attachment of this character wherein the pistons in the pump cylinders are reciprocatingly movable under the action of levers which are operated from cams, the latter being upon the rear axle of the automobile while the pump cylinders and piston levers are supported beneath the base frame of the body of said automobile so that on relative movements of the body and axle the pump attachment will be actuated for the supplying of air to a storage tank or reservoir for the subsequent consumption of the air therefrom as the occasion may require.

A further object of the invention is the provision of a pump structure of this character which is novel in form, capable of application to various styles or types of automobiles without necessitating any change in the construction thereof and will automatically operate from the vibrations imparted to and from the body of said automobile.

A still further object of the invention is the provision of a pump attachment of this character which is simple in construction, positive, and efficient and reliable in its operation, strong, durable and inexpensive in manufacture and installation.

With these and other objects in view the invention consists in the features of construction, combination and arrangement of parts as will be hereinafter fully described, illustrated in the accompanying drawing and pointed out in the claims, hereunto appended.

In the accompanying drawing:

Figure 1 is a rear elevation showing the rear axle and base frame of an automobile body with the pump attachment in accordance with the invention applied, a portion of the attachment being broken away;

Fig. 2 is an enlarged fragmentary vertical sectional elevation;

Fig. 3 is a sectional view on the line 3—3 of Fig. 2;

Fig. 4 is a sectional view on the line 4—4 of Fig. 1.

Similar reference characters indicate corresponding parts throughout the several views in the drawing.

Referring to the drawing in detail A designates a cross sill of the base frame for the body of the automobile, B the rear axle casing, and C the rear spring which is fastened to both the cross sill A and the axle casing B in the usual well known manner, the spring, the axle casing and the cross sill being of the usual construction.

The pump attachment comprises a pair of hollow castings 10 which are bolted or otherwise fastened to the ends of the cross sill A in depending relation thereto. Each casting constitutes a mud or dust guard and has stationarily arranged therein a horizontally disposed air pump cylinder 11 which is open at its outer end and closed at its opposite end and leading from this closed end is a pipe 12 which delivers compressed air from the cylinder 11 to a suitable tank or reservoir adapted to be supported upon the body of the automobile at any desirable point and working within this cylinder 11 is a reciprocatingly movable valve piston head 13 which on movement toward the open end of the cylinder draws atmospheric air into the latter and on the reverse stroke compresses said air and forces the same through the pipe 12 into the storage tank or reservoir.

Formed on the side walls of each casting 10 at the lowermost end thereof are bearings 14 having mounted therein a pivot 15 carrying a rocking lever 16 which has its uppermost end 17 at one side of the pivot 15 projected into the casting 10 and to this end 17 is pivotally connected the piston rod 18 which is also pivoted in the piston head 13 and on rocking movement of the lever 16 the piston head is reciprocatingly moved within the cylinder 11 for the actuation of the pump, the lever 16 being rocked in a manner presently described.

Each rocking lever 16 has its lowermost end 19 which is at the opposite side of the pivot 15 extended crosswise of the rear axle casing B and carries a series of studs 20 forming roller channels on which are supported friction rollers 21, the same being arranged in close relation to each other while fixed to the axle casing B in any suitable manner is a cam 22, the cam edge 23 of which has playing upon the same the rollers 21 and mounted within the casting 10 is a coiled compression spring 24 which is supported in any suitable manner therein and has one end working against the end 17 of the lever 16 so as to positively hold the rollers 21 in working engagement with the cam edge 23 of the cam 22 at all times so that on relative movements of the base sill A and the axle casing B resultant from vibrations, shocks or jars incident to the travel of the automobile which lever 16 will be rocked for reciprocatingly moving the piston heads 13 in the cylinders 11 thereby causing a pumping action for the supplying of air from the pump cylinders 11 through the pipes 12 leading therefrom to a storage tank or reservoir for the subsequent use of the compressed air therefrom for the filling of the tires or the working of a starter or for any other purpose desired.

It is of course understood that the pipes 12 have fitted therein suitable check valves to prevent the backflow of air therefrom into the cylinders on the outward stroke of each piston head in the operation of the pump attachment.

In the vibrations incident to the travel of the automobile the pump attachment will be active for the automatic operation thereof to supply air from the cylinders 11 of the pump to a storage tank or reservoir which may be of any approved type for the subsequent use of the air therein as the occasion may require.

The attachment by reason of its particular construction is adaptable for installation on various types of automobiles and more particularly applicable to the Ford type of automobile. However, it is to be understood that such changes, variations, and modifications may be made in the invention without departing from the spirit thereof or sacrificing any of its advantages and as fall properly within the scope of the claims hereunto appended.

From the foregoing it is thought that the construction and operation of the attachment will be clearly understood and therefore a more extended explanation has been omitted for the sake of brevity.

What is claimed is:

1. A pump attachment of the character described comprising air pumping mechanism adapted to be supported beneath the body of an automobile, a lever pivoted at one side of the pumping mechanism and having connection therewith for operating the same, friction rollers supported by said lever, a cam adapted to be mounted on the axle of said automobile and engaged by the friction rollers, and means active upon the lever for partially holding the rollers in working relation to the cam.

2. A pump attachment of the character described comprising air pumping mechanism adapted to be supported beneath the body of an automobile, a lever pivoted at one side of the pumping mechanism and having connection therewith for operating the same, friction rollers supported by said lever, a cam adapted to be mounted on the axle of said automobile and engaged by the friction rollers, means active upon the lever for partially holding the rollers in working relation to the cam, and a pipe leading from the pumping mechanism for delivering air therefrom to a point of storage.

3. A pump attachment of the character described comprising air pumping mechanism adapted to be supported beneath the body of an automobile, a lever pivoted at one side of the pumping mechanism and having connection therewith for operating the same, friction rollers supported by said lever, a cam adapted to be mounted on the axle of said automobile and engaged by the friction rollers, means active upon the lever for partially holding the rollers in working relation to the cam, and a casting supporting the pumping mechanism and said lever and forming a mud and dust guard therefor.

In testimony whereof I affix my signature.

CHESTER R. WEST.